United States Patent
Kanakarajan et al.

(10) Patent No.: US 10,063,383 B1
(45) Date of Patent: Aug. 28, 2018

(54) APPARATUS, SYSTEM, AND METHOD FOR IMPROVING THE ENERGY EFFICIENCY OF LINK AGGREGATION GROUPS

(71) Applicant: Juniper Networks, Inc., Sunnyvale, CA (US)

(72) Inventors: Ravindranath C Kanakarajan, Bangalore (IN); Srinivasan Venkatakrishnan, Bangalore (IN); Prabhu Raj V.K., Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 200 days.

(21) Appl. No.: 14/634,587

(22) Filed: Feb. 27, 2015

(51) Int. Cl.
   *H04J 3/16* (2006.01)
   *H04L 12/10* (2006.01)
   *H04L 12/891* (2013.01)

(52) U.S. Cl.
   CPC .............. *H04L 12/10* (2013.01); *H04L 47/41* (2013.01)

(58) Field of Classification Search
   None
   See application file for complete search history.

(56) References Cited

U.S. PATENT DOCUMENTS

| | | | |
|---|---|---|---|
| 6,366,143 B1 | 4/2002 | Liu et al. | |
| 7,336,605 B2 * | 2/2008 | Bruckman | H04L 47/10 370/230 |
| 8,077,613 B2 * | 12/2011 | Bitar | H04L 41/0896 370/230 |
| 8,448,006 B2 | 5/2013 | Floyd et al. | |
| 9,594,423 B1 | 3/2017 | Bohra et al. | |
| 2008/0089236 A1 * | 4/2008 | Kotrla | H04L 12/14 370/242 |
| 2008/0214140 A1 | 9/2008 | Caveney et al. | |

(Continued)

OTHER PUBLICATIONS

Rahul Kulkarni, et al; System, Method, and Apparatus for Detecting Fault Conditions Experienced by Remote Physical Ports; U.S. Appl. No. 14/265,321, filed Apr. 29, 2014.

(Continued)

*Primary Examiner* — Mohammad Anwar
*Assistant Examiner* — Angel Brockman
(74) *Attorney, Agent, or Firm* — FisherBroyles, LLP

(57) ABSTRACT

The disclosed apparatus may include a set of communication ports that facilitate communication with a network device via a set of communication links that collectively operate as a LAG bundle. The disclosed apparatus may also include a link-management unit communicatively coupled to the set of communication ports that facilitate communication with the network device. The link-management unit may detect an amount of communication activity on one or more active communication links included in the set of communication links that are collectively operating as the LAG bundle. The link-management unit may then determine that the amount of communication activity detected on the active communication links has reached a certain threshold. In response to this determination, the link-management unit may modify the active communication links included in the set of communication links to account for the amount of communication activity. Various other apparatuses, systems, and methods are also disclosed.

15 Claims, 6 Drawing Sheets

(56) References Cited

U.S. PATENT DOCUMENTS

| | | | |
|---|---|---|---|
| 2008/0240133 A1* | 10/2008 | Tanaka | H04L 45/245 370/401 |
| 2008/0304519 A1* | 12/2008 | Koenen | H04L 12/10 370/477 |
| 2009/0141622 A1* | 6/2009 | Bitar | H04L 41/0896 370/225 |
| 2011/0051734 A1* | 3/2011 | Cardona | H04L 47/125 370/400 |
| 2011/0283116 A1 | 11/2011 | Ban | |
| 2012/0191998 A1 | 7/2012 | Tazebay et al. | |
| 2013/0003746 A1* | 1/2013 | Klein | H04L 12/10 370/401 |
| 2013/0243007 A1 | 9/2013 | Ding et al. | |

OTHER PUBLICATIONS

Amit Bohra, et al; Apparatus, System, and Method for Improving the Energy Efficiency of Routers; U.S. Appl. No. 14/589,724, filed Jan. 5, 2015.

Janssen, Cory "Link Aggregation (LAG)", http://www.techopedia.com/definition/24969/link-aggregation-lag, as accessed Jan. 21, 2015, Techopedia, (Nov. 2011).

Amit Bohra, et al; Apparatus, System, and Method for Improving the Energy Efficiency of Routers; U.S. Appl. No. 15/417,187, filed Jan. 26, 2017.

\* cited by examiner

US 10,063,383 B1

APPARATUS, SYSTEM, AND METHOD FOR IMPROVING THE ENERGY EFFICIENCY OF LINK AGGREGATION GROUPS

BACKGROUND

Many service providers are concerned about the financial and/or environmental implications of their electrical power consumption. One of the primary sources of many service providers' electrical power consumption is the physical communication links (e.g., fiber optic links) between routers. These communication links are often used by service providers to facilitate and/or direct the flow of network traffic within their networks.

In some situations, service providers may bundle these links together as a Link Aggregation Group (LAG) (sometimes also referred to as a "LAG bundle") that acts as a single logical connection between routers. These LAG bundles may serve a variety of purposes. For example, a conventional LAG bundle may increase the amount of communication throughput and/or bandwidth available between routers. Additionally or alternatively, the conventional LAG bundle may facilitate communication load-balancing and/or high availability of communication between the routers in the event that one or more of the links included in the LAG bundle experience a failure.

Unfortunately, the links included in the conventional LAG bundle may cause the routers to consume electrical power even when those links are not facilitating and/or directing significant amounts of network traffic. As a result, such a LAG bundle may potentially lead to high energy costs and/or negative environmental impact. The instant disclosure, therefore, identifies and addresses a need for apparatuses, systems, and methods for improving the energy efficiency of LAG bundles.

SUMMARY

As will be described in greater detail below, the instant disclosure generally relates to apparatuses, systems, and methods for improving the energy efficiency of LAG bundles. In one example, an apparatus for accomplishing such a task may include a set of communication ports that facilitate communication with a network device via a set of communication links that collectively operate as a LAG bundle. The apparatus may also include a link-management unit communicatively coupled to the set of communication ports that facilitate communication with the network device. The link-management unit may detect an amount of communication activity on one or more active communication links included in the set of communication links that are collectively operating as the LAG bundle. The link-management unit may then determine that the amount of communication activity detected on the active communication links has reached a certain threshold. In response to determining that the amount of communication activity has reached the certain threshold, the link-management unit may modify the active communication links included in the set of communication links to account for the amount of communication activity.

Similarly, a router incorporating the above-described apparatus may include a set of communication ports that facilitate communication with another router via a set of communication links that collectively operate as a LAG bundle. The router may also include a link-management unit communicatively coupled to the set of communication ports that facilitate communication with the other router. The link-management unit may detect an amount of communication activity on one or more active communication links included in the set of communication links that are collectively operating as the LAG bundle. The link-management unit may then determine that the amount of communication activity detected on the active communication links has reached a certain threshold. In response to determining that the amount of communication activity has reached the certain threshold, the link-management unit may modify the active communication links included in the set of communication links to account for the amount of communication activity.

A corresponding method may include identifying a set of communication ports that facilitate communication with a network device via a set of communication links that collectively operate as a LAG bundle. The method may also include detecting an amount of communication activity on one or more active communication links included in the set of communication links that are collectively operating as the LAG bundle. The method may further include determining that the amount of communication activity detected on the active communication links has reached a certain threshold. Finally, the method may include modifying, in response to determining that the amount of communication activity has reached the certain threshold, the active communication links included in the set of communication links to account for the amount of communication activity.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
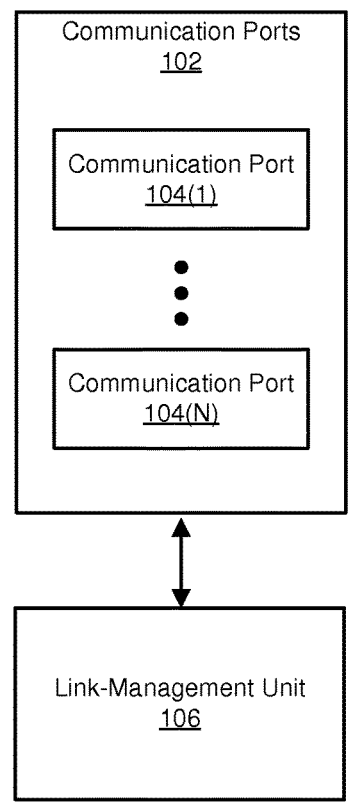
FIG. 1 is a block diagram of an exemplary apparatus for improving the energy efficiency of LAG bundles.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for improving the energy efficiency of LAG bundles. As will be explained in greater detail below, by monitoring and/or tracking the amount of network traffic exchanged between network devices via the active communication links of a LAG bundle, embodiments of the instant disclosure may be able to help optimize the amount of electrical power consumed by the LAG bundle. For example, embodiments of the instant disclosure may determine, based at least in part on the amount of network traffic exchanged between the network devices, that the active communication links of the LAG bundle are currently underutilized and/or not necessary to facilitate the amount of network traffic exchanged between the network devices. As a result, embodiments of the instant disclosure may deactivate one or more of the active communication links of the LAG bundle to conserve energy, save on operating costs that stem from using the LAG bundle, and/or decrease the LAG bundle's impact on the environment.

In addition, embodiments of the instant disclosure may determine, based at least in part on the amount of network traffic exchanged between the network devices, that the active communication links of the LAG bundle are currently overloaded and/or unable to facilitate any more network traffic between the network devices. As a result, embodiments of the instant disclosure may activate one or more previously inactive communication links of the LAG bundle to accommodate any additional network traffic and/or the possibility of any future traffic spikes or bursts. By activating and/or deactivating communication links of the LAG bundle based at least in part on the communication needs of the network devices, embodiments of the instant disclosure may be able to help optimize the amount of electrical power consumed by the LAG bundle and/or pass on the corresponding savings to a service provider using the LAG bundle within its network.

The terms "link aggregation group" and the abbreviations "LAG" and "LAG bundle," as used herein, generally refer to any set of communication links that serve and/or act as a single logical connection between network devices. In one example, a LAG bundle may effectively increase the amount of communication throughput and/or bandwidth available between network devices. Additionally or alternatively, a LAG bundle may balance communication traffic across the bundle's communication links and/or provide high availability of communication between network devices in the event that one or more of the bundle's links experience a failure.

In some examples, a LAG bundle may include a set of communication links capable of exchanging network traffic at different speeds. For example, a LAG bundle may include at least one 1 Gigabit Ethernet (GbE) communication link capable of transmitting network traffic at a rate of 1 Gigabit per second (Gb/s). In this example, the LAG bundle may also include at least one 10 GbE communication link capable of transmitting network traffic at a rate of 10 Gb/s. Additionally or alternatively, the LAG bundle may include at least one 40 GbE communication link capable of transmitting network traffic at a rate of 40 Gb/s.

Accordingly, embodiments of the instant disclosure may be able to improve the energy efficiency of LAG bundles that include communication links operating at different speeds. In addition, embodiments of the instant disclosure may achieve higher levels of energy efficiency with such LAG bundles by selecting which links to activate and/or deactivate based at least in part on the communication needs of the network devices. For example, network devices may select a 10 GbE link for activation when the network devices have a need to transfer between 1 GbE and 10 GbE of additional data to one another. Additionally or alternatively, the network devices may select a 40 GbE link for activation when the network devices have a need to transfer between 10 GbE and 40 GbE of additional data to one another. By selecting which links to activate and/or deactivate in this way, embodiments of the instant disclosure may be able to select the link that represents the best fit (e.g., based on the link's bandwidth) for the LAG bundle at a particular point in time.

The following will provide, with reference to FIG. 1, examples of apparatuses that improve the energy efficiency of LAG bundles. The discussion corresponding to FIGS. 2 and 3 will provide a detailed description of exemplary implementations of an apparatus that improves the energy efficiency of LAG bundles. The discussion corresponding to FIG. 4 will provide a detailed description of exemplary link-utilization information that includes a utilization score representative of the amount of communication traffic exchanged with a network device via at least one active communication link. The discussion corresponding to FIG. 5 will provide a detailed description of an exemplary method for improving the energy efficiency of routers. Finally, the discussion corresponding to FIG. 6 will provide numerous examples of systems that may include the apparatus shown in FIG. 1.

FIG. 1 shows a block diagram of an exemplary apparatus 100 for improving the energy efficiency of LAG bundles. The term "energy efficiency," as used herein, generally refers to the amount and/or level of electrical power consumed by a LAG bundle and/or a network device using the LAG bundle to facilitate and/or direct the flow of network traffic within a network. In one example, a LAG bundle may facilitate and/or direct the flow of network traffic between network devices within a network. In other words, these network devices may exchange network traffic with one another by way of the LAG bundle. In this example, the energy efficiency of LAG bundle may represent the amount of electrical power consumed by the LAG bundle itself and/or the network devices using the LAG bundle.

As illustrated in FIG. 1, apparatus 100 may include a link-management unit 106 in communication with a set of communication ports 102. The term "link-management unit," as used herein, generally refers to any type or form of physical hardware, circuit, device, and/or processor that performs certain Input/Output (I/O) operations and/or computing tasks directed to managing and/or optimizing communication links of a LAG bundle. In one example, link-management unit 106 may represent an integrated circuit whose configuration and/or infrastructure is at least partially fixed. Additionally or alternatively, link-management unit 106 may represent an integrated circuit whose configuration and/or infrastructure is at least partially variable and/or programmable. Examples of link-management unit 106 include, without limitation, Field-Programmable Gate Arrays (FPGAs), Central Processing Units (CPUs), processors, microprocessors, microcontrollers, Application-Specific Integrated Circuits (ASICs), software modules installed one or more of the same, portions of one or more of the same, variations of one or more of the same, combinations of one or more of the same, or any other suitable link-management unit.

In some examples, set of communication ports 102 may include communication ports 104(1)-(N) that facilitate communication with a network device via a set of communication links that collectively operate as a LAG bundle. The term "communication port," as used herein, generally refers to any type or form of physical interface, device, and/or housing that forms at least a portion of a connection and/or link within a network. In one example, communication ports 104(1)-(N) may each facilitate one or more networking functions (e.g., receiving, transmitting, forwarding, transferring, and/or carrying data packets) within a network device and/or across a network. In this example, communication ports 104(1)-(N) may each need to consume electrical power to facilitate such networking functions. Examples of communication ports 104(1)-(N) include, without limitation, Quad Small Form-factor Pluggable (QSFP) ports, Ethernet ports, Fibre Channel ports, optical ports, InfiniBand ports, CXP connectors, Multiple-Fiber Push-On/Pull-Off (MPO) connectors, XAUI ports, XFP transceivers, XFI interfaces, C Form-factor Pluggable (CFP) transceivers, variations of one or more of the same, combinations of one or more of the same, or any other suitable communication ports.

The terms "communication link" and simply "link," as used herein, generally refer to any type or form of connection that facilitates the flow of network traffic between network devices. In some examples, a communication link may include and/or represent a connection formed between a communication port of one network device and a communication port of another network device. Additionally or alternatively, a communication link may include and/or represent a physical communication cable that carries network traffic from one network device to another. Examples of communication links include, without limitation, fiber optic connections, Ethernet cable connections, copper cable connections, CATegory (CAT) 6 cable connections, variations of one or more of the same, combinations of one or more of the same, or any other suitable communication links.

In some examples, link-management unit 106 may be communicatively coupled to set of communication ports 102. In such examples, link-management unit 106 may detect an amount of communication activity on one or more active communication links included in the set of communication links that are collectively operating as the LAG bundle. The term "active communication link," as used herein, generally refers to any type or form of communication link that has been designated and/or assigned to carry network traffic within a LAG bundle. The active communication links may be those links that are turned on to facilitate carrying network traffic (as opposed to those links that have been turned off to conserve energy, save on operating costs that stem from using the LAG bundle, and/or decrease the LAG bundle's impact on the environment).

In one example, the communication activity detected by link-management unit 106 may include and/or represent data packets transmitted by one or more of communication ports 102 that form part of the active communication links. Additionally or alternatively, the communication activity detected by link-management unit 106 may include and/or represent data packets received by one or more of communication ports 102 that form part of the active communication links.

In some examples, link-management unit 106 may determine that the amount of communication activity detected on the active communication links has reached a certain threshold. In response to determining that the amount of communication activity has reached that threshold, link-management unit 106 may modify the active communication links included in the set of communication links to account for the amount of communication activity.

Figure 2:
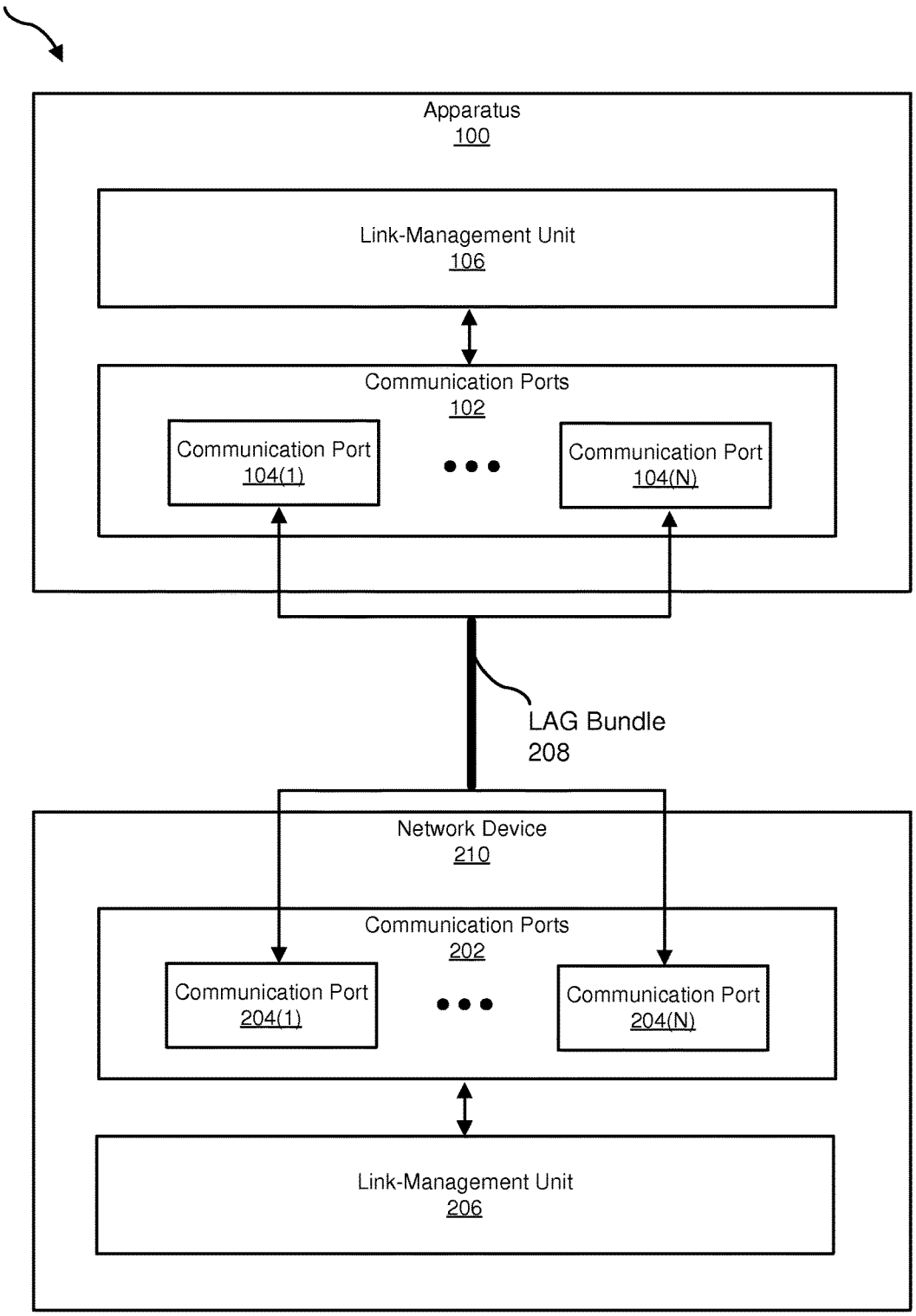
FIG. 2 is a block diagram of an exemplary implementation of an apparatus for improving the energy efficiency of LAG bundles.

FIG. 2 shows a block diagram of an exemplary implementation 200 of apparatus 100 for improving the energy efficiency of LAG bundles. As illustrated in FIG. 2, implementation 200 may include apparatus 100 in communication with a network device 210 via a LAG bundle 208. In one example, network device 210 may include link-management unit 206 and a set of communication ports 202. The term "network device," as used herein generally refers to any type or form of device, apparatus, and/or system capable of routing and/or forwarding network traffic among devices of a network. Examples of network device 210 include, without limitation, routers, switches, bridges, network hubs, gateways, nodes, variations of one or more of the same, combinations of one or more of the same, or any other suitable network device.

In one example, link-management unit 206 may include and/or represent any of the same hardware, software, and/or firmware as link-management unit 106. In this example, link-management unit 206 may execute and/or perform the same script and/or program as link-management unit 106 for managing and/or optimizing communication links of LAG bundle 208. While link-management unit 106 may manage communication ports 104(1)-(N) that form one side of the communication links within LAG bundle 208, link-management unit 206 may manage communication ports 204(1)-(N) that form the other side of the communication links within LAG bundle 208.

As illustrated in FIG. 2, set of communication ports 202 may include communication ports 204(1)-(N) that facilitate communication with apparatus 100 via a set of communication links that collectively operate as LAG bundle 208. In one example, communication ports 204(1)-(N) may each facilitate one or more networking functions (e.g., receiving, transmitting, forwarding, transferring, and/or carrying data packets) within network device 210 and/or across a network. In this example, communication ports 104(1)-(N) may each need to consume electrical power to facilitate such networking functions. Examples of communication ports 204(1)-(N) include, without limitation, QSFP ports, Ethernet ports, Fibre Channel ports, optical ports, InfiniBand ports, CXP connectors, MPO connectors, XAUI ports, XFP transceivers, XFI interfaces, CFP transceivers, variations of one or more of the same, combinations of one or more of the same, or any other suitable communication ports.

In one example, link-management unit 106 may detect an amount of communication activity on one or more active communication links within LAG bundle 208. For example, link-management unit 106 may monitor the amount of communication traffic exchanged between apparatus 100 and network device 210 via the active communication links within LAG bundle 208. While monitoring the amount of communication traffic in this way, link-management unit 106 may detect and/or track the number of data packets transmitted and/or received by one or more of communication ports 102 that form part of the active communication links within LAG bundle 208.

In some examples, link-management unit 106 may determine that the amount of communication activity detected on the active communication links within LAG bundle 208 has reached a certain threshold. For example, link-management unit 106 may determine that the number of data packets transmitted and/or received by one or more of communication ports 102 has reached a certain threshold. In one example, that threshold may include and/or represent a per-link threshold that is specific to the communication activity detected on a single communication link within LAG bundle 208. In another example, that threshold may include and/or represent a per-bundle threshold that corresponds to the collective amount of communication activity detected on all active communication links within LAG bundle 208.

In one example, the amount of communication activity compared against the threshold may include the sum of all the receive-related communication statistics and the sum of all the transmit-related communication statistics. In another example, the amount of communication activity compared against the threshold may include either the sum of all the receive-related communication statistics or the sum of all the transmit-related communication statistics. For example, the amount of communication activity compared against the threshold may include only the larger of (1) the sum of all the receive-related communication statistics and (2) the sum of all the transmit-related communication statistics.

In one example, link-management unit 106 may determine that the amount of communication activity detected on the active communication links within LAG bundle 208 has increased above an upper threshold. Additionally or alternatively, link-management unit 106 may determine that the amount of communication activity detected on the active communication links within LAG bundle 208 has decreased below a lower threshold.

In response to determining that the amount of communication activity has reached that threshold, link-management unit 106 may modify the active communication links within LAG bundle 208 to account for the amount of communication activity. For example, in the event that the amount of communication activity has increased above an upper threshold, link-management unit 106 may modify the active communication links within LAG bundle 208 by activating a previously inactive communication link within LAG bundle 208 to account for the increased amount of communication. In this example, link-management unit 106 may activate the previously inactive communication link by turning on and/or powering on one of communication ports 102 that forms part of this communication link. Additionally or alternatively, link-management unit 106 may operate one of the active communication links at a faster rate, thereby potentially resulting in increased power consumption.

As another example, in the event that the amount of communication activity has decreased below a lower threshold, link-management unit 106 may modify the active communication links within LAG bundle 208 by deactivating a previously active communication link within LAG bundle 208 to account for the decreased amount of communication. In this example, link-management unit 106 may deactivate the previously active communication link within LAG bundle 208 by turning off and/or powering down one of communication ports 102 that forms part of this communication link. By turning off and/or powering down one of communication ports 102 in this way, link-management unit 106 may be able to conserve energy, save on operating costs that stem from using LAG bundle 208, and/or decrease the environmental impact of LAG bundle 208. Additionally or alternatively, link-management unit 106 may operate one of the active communication links at a slower rate, thereby potentially resulting in decreased power consumption.

In some examples, link-management unit 106 may determine that the amount of communication activity detected on the active communication links within LAG bundle 208 has reached that threshold based at least in part on a utilization score. For example, link-management unit 106 may calculate a utilization score that represents the monitored amount of communication traffic exchanged between apparatus 100 and network device 210 relative to a maximum amount of communication traffic capable of being exchanged between apparatus 100 and network device 210 via the active communication links within LAG bundle 208. This utilization score may be represented as percentage and/or ratio calculated by dividing the monitored amount of communication traffic exchanged via the active communication links within LAG bundle 208 by the maximum amount of communication traffic capable of being exchanged via the active communication links within LAG bundle 208.

Continuing with this example, link-management unit 106 may determine that the utilization score has reached a certain threshold. In response to this determination, link-management unit 106 may modify the active communication links within LAG bundle 208 to account for the monitored amount of communication traffic exchanged via the active communication links within LAG bundle 208.

In some examples, link-management unit 106 may track the amount of communication traffic exchanged between apparatus 100 and network device 210 via LAG bundle 208 over a certain period of time. By tracking the amount of communication traffic exchanged in this way, link-management unit 106 may generate and/or develop a representation of the historical usage of LAG bundle 208. Link-management unit 106 may then use this representation of the historical usage of LAG bundle 208 to predict the number of active communication links that will be needed to facilitate communication between apparatus 100 and network device 210 at a certain point in time.

Additionally or alternatively, link-management unit 106 may modify the active communication links within LAG bundle 208 to coincide with the number of active communication links predicted to be needed to facilitate communication between apparatus 100 and network device 210 at that point in time. By modifying the active communication links within LAG bundle 208 in this way, link-management unit 106 may be able to accommodate additional network traffic and/or the possibility of traffic spikes or bursts predicted based at least in part on the representation of the historical usage of LAG bundle 208.

As mentioned above, link-management unit 206 included in network device 210 may execute and/or perform the same script and/or program as link-management unit 106 for managing and/or optimizing communication links of LAG bundle 208. Accordingly, link-management unit 206 may perform any of the functions described above in connection with link-management unit 106 for managing and/or optimizing communication links of LAG bundle 208 (except from the perspective of communication ports 204(1)-(N) rather than from the perspective of communication ports 104(1)-(N)).

For example, link-management unit 206 may detect an amount of communication activity on one or more active communication links within LAG bundle 208. In this example, link-management unit 206 may determine that the amount of communication activity detected on the active communication links within LAG bundle 208 has reached a certain threshold. In response to determining that the amount of communication activity has reached that threshold, link-management unit 206 may modify the active communication links within LAG bundle 208 (by, e.g., turning on or off one or more of communication ports 202 that form part of the communication links within LAG bundle 208) to account for the amount of communication activity.

Figure 3:
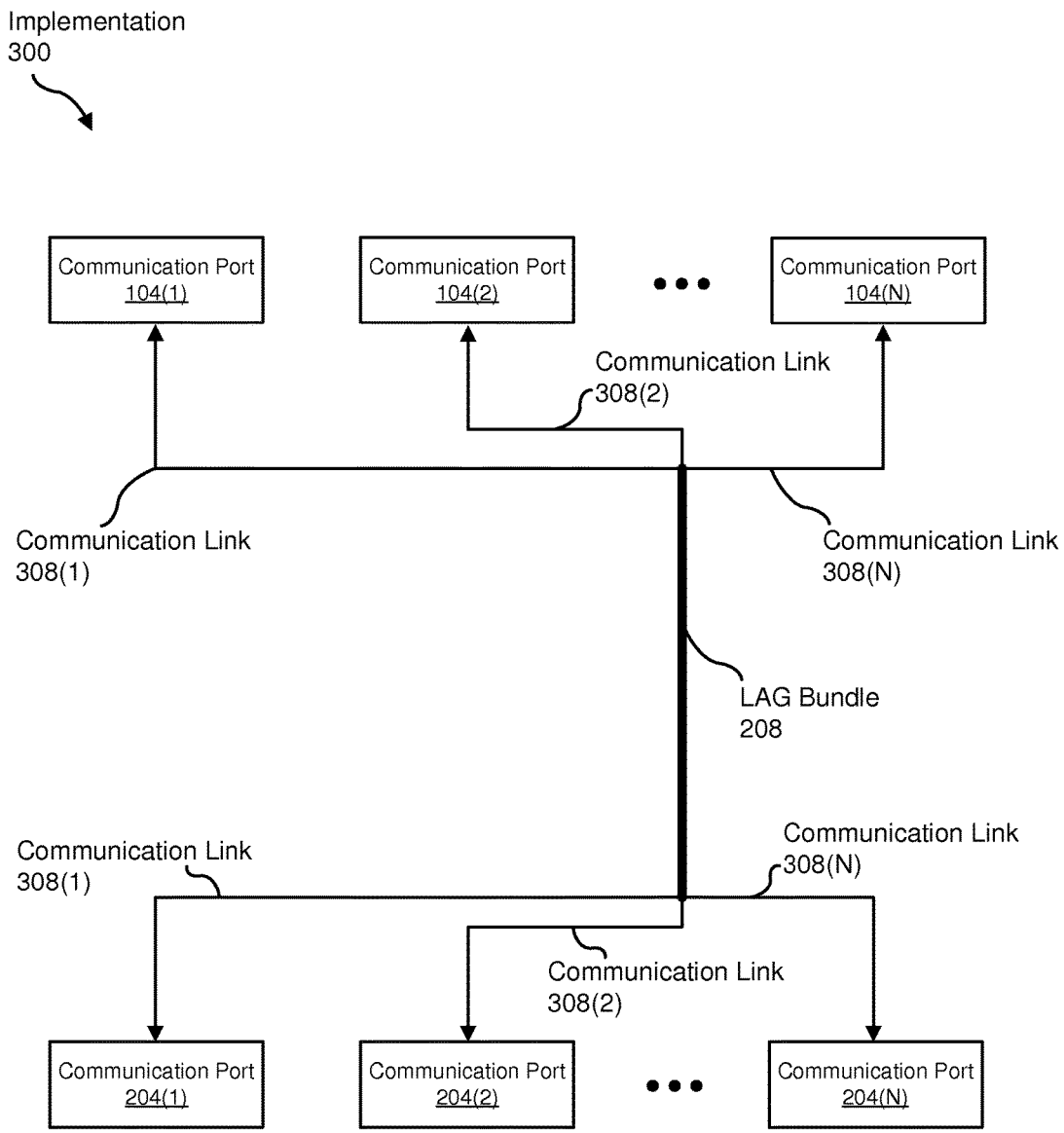
FIG. 3 is a block diagram of an exemplary implementation of an apparatus for improving the energy efficiency of LAG bundles.

FIG. 3 shows a block diagram of an exemplary implementation 300 of portions of apparatus 100 for improving the energy efficiency of LAG bundles. As illustrated in FIG. 3, implementation 200 may include LAG bundle 208 that connects communication ports 104(1), 104(2), and 104(N) with communication ports 204(1), 204(2), and 204(N), respectively, by way of communication links 308(1), 308(2), and 308(N), respectively. In a specific example, link-management units 106 and 206 (not illustrated in FIG. 3) may initially deactivate all communication links within LAG bundle 208 except for communication link 308(1). In other words, link-management unit 106 may turn on communication port 104(1) and turn off communication ports 104(2) and 104(N). Similarly, link-management unit 206 may turn on communication port 204(1) and turn off communication ports 204(2) and 204(N). As a result, communication link 308(1) may initially be the only active communication link within LAG bundle 208.

In this example, apparatus 100 and network device 210 (not illustrated in FIG. 3) may initially exchange network traffic via only communication link 308(1). However, link-management units 106 and 206 may later detect an amount of communication activity on communication link 308(1) that has increased above an upper threshold. For example, link-management units 106 and 206 may detect network traffic being exchanged between apparatus 100 and network device 210 via communication link 308(1) at a rate of 800 Megabits per second (Mb/s). In this example, the upper threshold for the amount of network traffic exchanged via communication link 308(1) may be a rate of 750 Mb/s. As a result, link-management units 106 and 206 may determine that the amount of network traffic being exchanged between apparatus 100 and network device 210 via communication link 308(1) exceeds the upper threshold of 750 Mb/s.

In response to this determination, link-management units 106 and 206 may activate communication link 308(2) to account for the amount of network traffic travelling through LAG bundle 208. For example, link-management unit 106 may turn on communication port 104(2), and link-management unit 206 may turn on communication port 204(2) to facilitate the flow of network traffic through communication link 308(2). As the amount of network traffic travelling through LAG bundle 208 continues to increase, link-management unit 106 may activate additional communication links within LAG bundle 208 one-by-one in this way until all of the communication links within LAG bundle 208 have been activated.

Once all of the communication links within LAG bundle 208 have been activated, apparatus 100 and network device 210 may be able to exchange network traffic via all of communication links 308(1), 308(2), and 308(N). In one example, link-management units 106 and 206 may later determine that the amount of communication activity on communication links 308(1), 308(2), and 308(N) has decreased below a lower threshold. For example, link-management units 106 and 206 may detect network traffic being exchanged between apparatus 100 and network device 210 via communication links 308(1), 308(2), and 308(N) at a rate of 34 Gb/s. In this example, the lower threshold for the amount of network traffic exchanged via all of communication links 308(1), 308(2), and 308(N) may be a rate of 35 Gb/s. As a result, link-management units 106 and 206 may determine that the amount of network traffic being exchanged between apparatus 100 and network device 210 via communication links 308(1), 308(2), and 308(N) has decreased below the lower threshold of 35 Gb/s.

In response to this determination, link-management units 106 and 206 may deactivate communication link 308(N) to account for the amount of network traffic travelling through LAG bundle 208. For example, link-management unit 106 may turn off communication port 104(N), and link-management unit 206 may turn on communication port 204(N) to conserve energy, save on operating costs that stem from using LAG bundle 208, and/or decrease the environmental impact of LAG bundle 208. As the amount of network traffic travelling through LAG bundle 208 continues to decrease, link-management unit 106 may deactivate additional communication links within LAG bundle 208 one-by-one in this way until only communication link 308(1) remains active.

In one example, link-management units 106 and 206 may skip over any faulty communication links in the process of activating additional communication links within LAG bundle 208 to account for increasing amounts of network traffic travelling through LAG bundle 208. For example, link-management units 106 and 206 may search for an inactive communication link within LAG bundle 208 to activate in response to determining that the amount of network traffic travelling through communication link 308(1) has increased above the upper threshold. During this search, link-management units 106 and 206 may identify communication link 308(2) as an inactive communication link. In this example, communication link 308(2) may be faulty, and link-management units 106 and 206 may determine that communication link 308(2) is faulty. As a result, link-management units 106 and 206 may activate another inactive communication link (such as communication link 308(N)) within LAG bundle 208 instead of apparently faulty communication link 308(2).

In another specific example, link-management unit 106 and 206 may activate and/or deactivate communication links within LAG bundle 208 based at least in part on a utilization score for LAG bundle 208. For example, link-management units 106 and 206 may determine that the amount of network traffic travelling through LAG bundle 208 equates to approximately 50% of the maximum capacity for LAG bundle 208. In this example, link-management units 106 and 206 may determine that, when the amount of network traffic travelling through LAG bundle 208 equates to approximately 50% of maximum capacity for LAG bundle 208, only communication links 308(1) and 308(2) are to remain active. As a result, link-management units 106 and 206 may either activate communication link 308(2) or deactivate communication link 308(N) (depending on the current configuration of LAG bundle 208) to account for the utilization score of 50% for LAG bundle 208.

Figure 4:
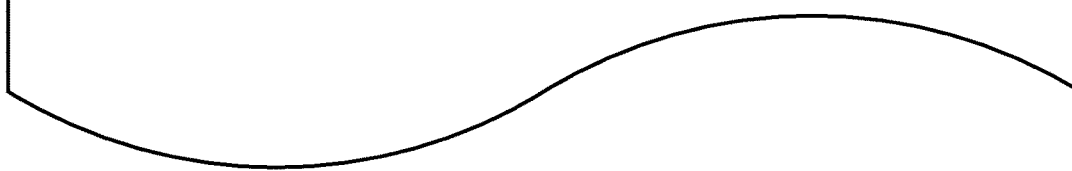
FIG. 4 is an illustration of exemplary link-utilization information that includes a utilization score representative of the amount of communication traffic exchanged with a network device via at least one active communication link.

In an additional specific example, link-management unit 106 and 206 may activate and/or deactivate communication links within LAG bundle 208 based at least in part on a utilization score for communication link 308(1). For example, link-management units 106 and 206 may analyze link-utilization information 400 in FIG. 4. As illustrated in FIG. 4, link-utilization information 400 may identify a communication link (in this example, communication link 308(1)), a utilization score for that communication link (in this example, 80%), the monitored amount of communication traffic travelling on that communication link (in this example, 800 Mb/s), and/or the maximum amount of communication traffic (in this example, 1000 Mb/s).

Continuing with this example, link-management units 106 and 206 may determine that the amount of network traffic travelling through communication link 308(1) equates to approximately 80% of the maximum capacity for communication link 308(1) based at least in part on link-utilization information 400. Additionally or alternatively, link-management units 106 and 206 may determine that, when the amount of network traffic travelling through communication link 308(1) equates to approximately 80% of the maximum capacity for communication link 308(1), communication link 308(2) should be activated to alleviate the load on communication link 308(1).

In a further specific example, link-management unit 106 may activate and/or deactivate communication links within LAG bundle 208 based at least in part on the historical usage of LAG bundle 208. For example, link-management unit 106 may track the amount of communication traffic exchanged between apparatus 100 and network device 210 via LAG bundle 208 over a period of 30 days. By tracking the amount of communication traffic exchanged in this way, link-management unit 106 may generate and/or develop a representation of the historical usage of LAG bundle 208. In this example, the representation of the historical usage of LAG bundle 208 may indicate high traffic spikes and/or bursts requiring all of the communication links within LAG bundle 208 to remain active during the peak hours of 10 AM to 5 PM Monday through Friday. Link-management unit 106 may use this representation of the historical usage of LAG bundle 208 to predict the need for maintaining all of the communication links within LAG bundle 208 active during the peak hours of during the peak hours of 10 AM to 5 PM Monday through Friday.

Continuing with this example, link-management unit 106 may modify LAG bundle 208 every weekday prior to those peak hours to ensure that all of the communication links within LAG bundle 208 are active at that point in time. By modifying LAG bundle 208 in this way, link-management unit 106 may be able to accommodate additional network traffic and/or the possibility of traffic spikes or bursts predicted based at least in part on the representation of the historical usage of LAG bundle 208.

Figure 5:
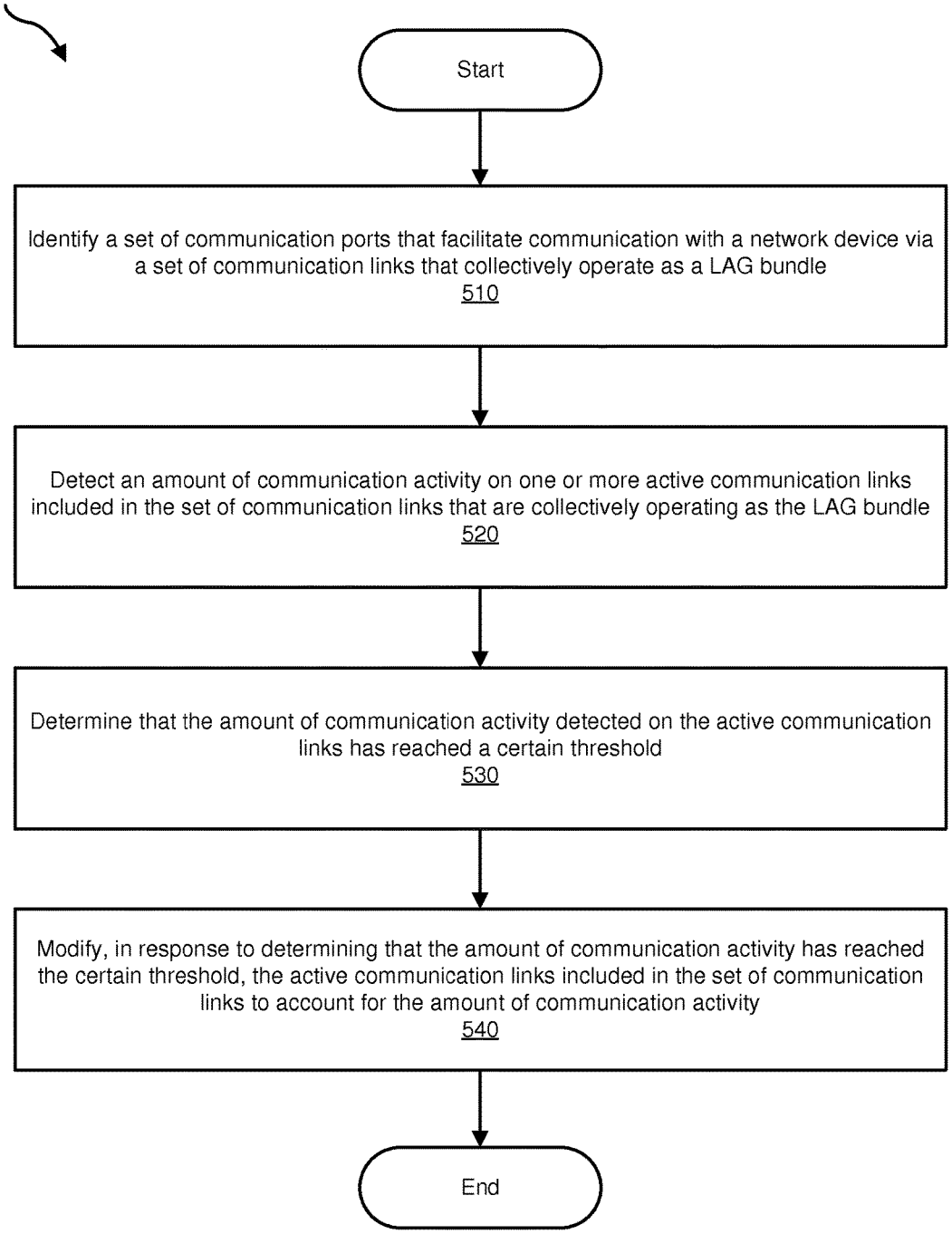
FIG. 5 is a flow diagram of an exemplary method for improving the energy efficiency of LAG bundles.

FIG. 5 is a flow diagram of an exemplary method 400 for improving the energy efficiency of LAG bundles. Method 500 may include the step of identifying a set of communication ports that facilitate communication with a network device via a set of communication links that collectively operate as a LAG bundle (510). This identifying step may be performed in a variety of ways. For example, link-management unit 106 may, as part of a router, identify set of communication ports 104(1)-(N) by enumerating all of the communication ports associated with the communication links operating as a LAG bundle.

Returning to FIG. 5, method 500 may also include the step of detecting an amount of communication activity on one or more active communication links included in the set of communication links that are collectively operating as the LAG bundle (520). This detecting step may be performed in a variety of ways. For example, link-management unit 106 may, as part of the router, detect an amount of communication activity on the active communication links within the LAG bundle. In one example, link-management unit 106 may monitor the amount of network traffic being transmitted and/or received by the communication ports that form part of the active communication links within the LAG bundle.

Returning to FIG. 5, method 500 may additionally include the step of determining that the amount of communication activity detected on the active communication links has reached a certain threshold (530). This determination step may be performed in a variety of ways. For example, link-management unit 106 may, as part of the router, determine that the amount of communication activity detected on the active communication links has reached a certain threshold. In one example, this threshold may be an upper threshold. In another example, this threshold may be a lower threshold.

Returning to FIG. 5, method 500 may further include the step of modifying, in response to determining that the amount of communication activity has reached the certain threshold, the active communication links included in the set of communication links to account for the amount of communication activity (540). This modification step may be performed in a variety of ways. For example, link-management unit 106 may, as part of the router, modify the active communication links by activating a previously inactive communication link within the LAG bundle to account for an increased amount of communication activity. Additionally or alternatively, link-management unit 106 may modify the active communication links by deactivating a previously active communication link within the LAG bundle to account for a decreased amount of communication activity.

Figure 6:
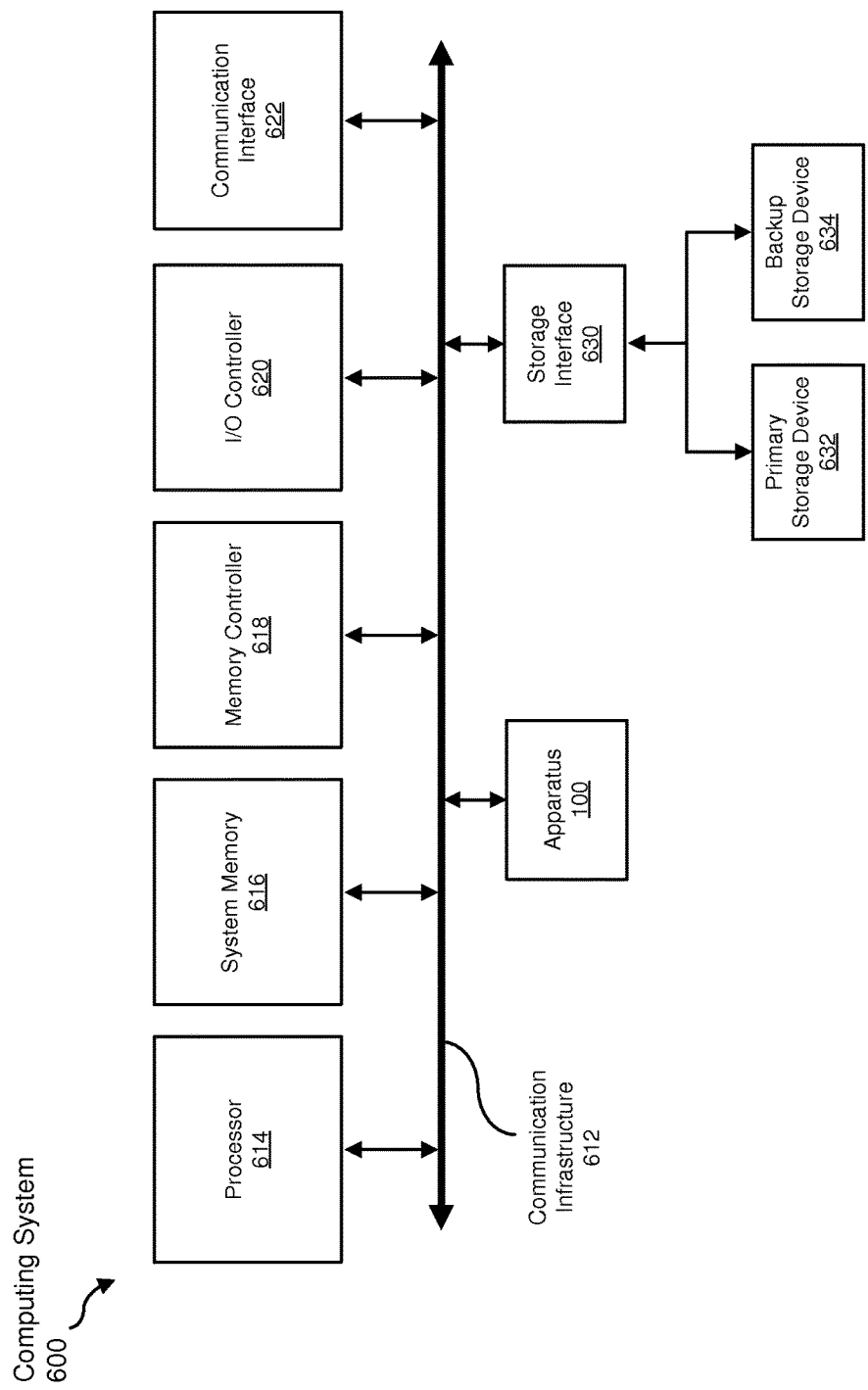
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 5. All or a portion of computing system 600 may also perform and/or be a means for performing and/or implementing any other steps, methods, or processes described and/or illustrated herein. In one example, computing system 600 may include apparatus 100 from FIG. 1.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive data to be transformed, transform the data, output a result of the transformation to detect an amount of communication activity on active communication links within a LAG bundle, use the result of the transformation to determine that the amount of communication activity has reached a certain threshold, and store the result of the transformation to modify the active communication links within the LAG bundle to account for the amount of communication activity. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
a set of communication ports that facilitate communication with a network device via a set of communication links that collectively operate as a link aggregation group, wherein the set of communication links comprises:
at least one inactive communication link that, when active, operates at a first rate; and
at least one other inactive communication link that, when active, operates at a second rate that differs from the first rate; and
a link-management unit communicatively coupled to the set of communication ports that facilitate communication with the network device, wherein the link-management unit:
detects an amount of network traffic on one or more active communication links included in the set of communication links that are collectively operating as the link aggregation group;
determines that the amount of network traffic detected on the active communication links has increased above an upper threshold;
modifies, in response to determining that the amount of network traffic has increased above an upper threshold, the active communication links included in the set of communication links by:
selecting which of the inactive communication link and the other inactive communication link to activate based at least in part on:
the amount of network traffic detected on the active communication links; and
the first rate and the second rate; and
activating the selected inactive communication link to account for the increased amount of network traffic;

tracks an amount of network traffic exchanged with the network device via the link aggregate group over a certain period of time;

predicts, based at least in part on the tracked amount of network traffic exchanged with the network device, a number of active communication links needed to facilitate communication with the network device at a certain point in time; and modifies the active communication links to coincide with the number of active communication links predicted to be needed to facilitate communication with the network device at the certain point in time.

2. The apparatus of claim 1, wherein the link-management unit activates the selected inactive communication link by turning on a communication port included in the set of communication ports that forms part of the selected inactive communication link.

3. The apparatus of claim 1, wherein the link-management unit:

determines that the amount of network traffic detected on the active communication links has decreased below a lower threshold; and modifies the active communication links by deactivating an active communication link included in the set of communication links to account for the decreased amount of network traffic.

4. The apparatus of claim 3, wherein the link-management unit deactivates the active communication link by turning off a communication port included in the set of communication ports that forms part of the active communication link.

5. The apparatus of claim 1, wherein the link-management unit:

monitors an amount of network traffic exchanged with the network device via the active communication links;

calculates, based at least in part on the monitored amount of network traffic exchanged with the network device, a utilization score that represents the monitored amount of network traffic relative to a maximum amount of network traffic capable of being exchanged with the network device via the active communication links;

determines that the utilization score has reached a certain threshold; and modifies, in response to determining that the utilization score has reached the certain threshold, the active communication links included in the set of communication links to account for the monitored amount of network traffic.

6. The apparatus of claim 1, wherein:

the set of communication links that collectively operate as the link aggregation group comprises:
a single active communication link; and
a plurality of inactive communication links; and the link-management unit:
detects the amount of network traffic on the single active communication link;
determines that the amount of network traffic detected on the single active communication link has increased above the upper threshold; and
activates at least one of the plurality of inactive communication links to account for the increased amount of network traffic.

7. The apparatus of claim 6, wherein the link-management unit:
searches for an inactive communication link to activate in response to determining that the amount of network traffic has increased above the upper threshold;

identifies, during the search, an inactive communication link included in the plurality of inactive communication links that appears to be faulty; and activates another inactive communication link included in the plurality of inactive communication links instead of the apparently faulty inactive communication link.

8. A router comprising:

a set of communication ports that facilitate communication with another router via a set of communication links that collectively operate as a link aggregation group, wherein the set of communication links comprises:
at least one inactive communication link that, when active, operates at a first rate; and
at least one other inactive communication link that, when active, operates at a second rate that differs from the first rate; and a link-management unit communicatively coupled to the set of communication ports that facilitate communication with the other router, wherein the link-management unit:

detects an amount of network traffic on one or more active communication links included in the set of communication links that are collectively operating as the link aggregation group;

determines that the amount of network traffic detected on the active communication links has increased above an upper threshold;

modifies, in response to determining that the amount of network traffic has increased above an upper threshold, the active communication links included in the set of communication links by:
selecting which of the inactive communication link and the other inactive communication link to activate based at least in part on:
the amount of network traffic detected on the active communication links; and
the first rate and the second rate; and
activating the selected inactive communication link to account for the increased amount of network traffic tracks an amount of network traffic exchanged with the other router via the link aggregate group over a certain period of time;

predicts, based at least in part on the tracked amount of network traffic exchanged with the other router, a number of active communication links needed to facilitate communication with the other router at a certain point in time; and modifies the active communication links to coincide with the number of active communication links predicted to be needed to facilitate communication with the other router at the certain point in time.

9. The router of claim 8, wherein the link-management unit activates the selected inactive communication link by turning on a communication port included in the set of communication ports that forms part of the selected inactive communication link.

10. The router of claim 8, wherein the link-management unit:

determines that the amount of network traffic detected on the active communication links has decreased below a lower threshold; and modifies the active communication links by deactivating an active communication link included in the set of communication links to account for the decreased amount of network traffic.

11. The router of claim 10, wherein the link-management unit deactivates the active communication link by turning off a communication port included in the set of communication ports that forms part of the active communication link.

12. The router of claim 8, wherein the link-management unit:
   monitors an amount of network traffic exchanged with the other router via the active communication links;
   calculates, based at least in part on the monitored amount of network traffic exchanged with the other router, a utilization score that represents the monitored amount of network traffic relative to a maximum amount of network traffic capable of being exchanged with the other router via the active communication links;
   determines that the utilization score has reached a certain threshold; and
   modifies, in response to determining that the utilization score has reached the certain threshold, the active communication links included in the set of communication links to account for the monitored amount of network traffic.

13. The router of claim 8, wherein:
   the set of communication links that collectively operate as the link aggregation group comprises:
      a single active communication link; and
      a plurality of inactive communication links; and
   the link-management unit:
      detects the amount of network traffic on the single active communication link;
      determines that the amount of network traffic detected on the single active communication link has increased above the upper threshold; and
      activates at least one of the plurality of inactive communication links to account for the increased amount of network traffic.

14. The router of claim 13, wherein the link-management unit:
   searches for an inactive communication link to activate in response to determining that the amount of network traffic has increased above the upper threshold;
   identifies, during the search, an inactive communication link included in the plurality of inactive communication links that appears to be faulty; and
   activates another inactive communication link included in the plurality of inactive communication links instead of the apparently faulty inactive communication link.

15. A method comprising:
   identifying a set of communication ports that facilitate communication with a network device via a set of communication links that collectively operate as a link aggregation group, wherein the set of communication links comprises:
      at least one inactive communication link that, when active, operates at a first rate; and
      at least one other inactive communication link that, when active, operates at a second rate that differs from the first rate;
   detecting an amount of network traffic on one or more active communication links included in the set of communication links that are collectively operating as the link aggregation group;
   determining that the amount of network traffic detected on the active communication links has increased above an upper threshold; and
   modifying, in response to determining that the amount of network traffic has increased above an upper threshold, the active communication links included in the set of communication links by:
      selecting which of the inactive communication link and the other inactive communication link to activate based at least in part on:
         the amount of network traffic detected on the active communication links; and
         the first rate and the second rate; and
      activating the selected inactive communication link to account for the increased amount of network traffic;
   tracking an amount of network traffic exchanged with the network device via the link aggregate group over a certain period of time;
   predicting, based at least in part on the tracked amount of network traffic exchanged with the network device, a number of active communication links needed to facilitate communication with the network device at a certain point in time; and
   modifying the active communication links to coincide with the number of active communication links predicted to be needed to facilitate communication with the network device at the certain point in time.

* * * * *

UNITED STATES PATENT AND TRADEMARK OFFICE
CERTIFICATE OF CORRECTION

PATENT NO. : 10,063,383 B1
APPLICATION NO. : 14/634587
DATED : August 28, 2018
INVENTOR(S) : Kanakarajan et al.

Page 1 of 1

It is certified that error appears in the above-identified patent and that said Letters Patent is hereby corrected as shown below:

On the Title Page

In Item (72), under "Inventors", in Column 1, Line 1, delete "Ravindranath C" and insert -- Ravindranath C. --, therefor.

In the Claims

In Column 18, Line 41, in Claim 8, delete "traffic" and insert -- traffic; --, therefor.

Signed and Sealed this
Twelfth Day of March, 2019

Andrei Iancu
*Director of the United States Patent and Trademark Office*